April 19, 1955 — C. L. FOUSHEE, JR — 2,706,649
TRANSVERSE SLIP JOINT FOR CONNECTING TUBULAR MEMBERS
Filed June 5, 1950

INVENTOR.
CLARENCE L. FOUSHEE, JR.
BY
Wm. H. Dean
AGENT

United States Patent Office 2,706,649
Patented Apr. 19, 1955

2,706,649

TRANSVERSE SLIP JOINT FOR CONNECTING TUBULAR MEMBERS

Clarence L. Foushee, Jr., San Diego, Calif., assignor to The Ryan Aeronautical Co., San Diego, Calif., a corporation of California Application June 5, 1950, Serial No. 166,209

2 Claims. (Cl. 285—129)

My invention relates to a transverse slip joint for connecting tubular members, and the objects of my invention are:

First, to provide a tube joint of this class which permits a pair of tubular members to be connected together in gas-tight eccentric relationship to each other;

Second, to provide a tube joint of this class in which a pair of tubes may be connected together in offset axial relationship with each other, and in which the ends of the tubes may move laterally of the axes of each other, under certain conditions;

Third, to provide a tube joint of this class which is readily adapted for use in connection with tubular members conducting high temperature exhaust gases from internal combustion engines, such as those conducted in the exhaust systems of aircraft engines or the like;

Fourth, to provide a tube joint of this class which may be used in confined areas, where space limitations longitudinally of the axes of the tubes connected are a consideration;

Fifth, to provide a tube joint of this class which permits the removal of individual tubular sections without disturbing adjacent sections;

Sixth, to provide a tube joint of this class which may be used in installations requiring combined relative lateral motion of connected tubes and efficient sealing characteristics of the tubular connection;

Seventh, to provide a tube joint of this class having clamp rings secured together by a peripheral clamp, providing a resilient preloaded structure for forcing tube connection flanges into intimate contact relationship with each other, for providing an efficient gas-tight connection for individual tubes; and Eighth, to provide a tube joint of this class which is very simple and economical of construction, efficient in operation, easy to service, and which will not readily deteriorate or get out of order.

Figure 1:
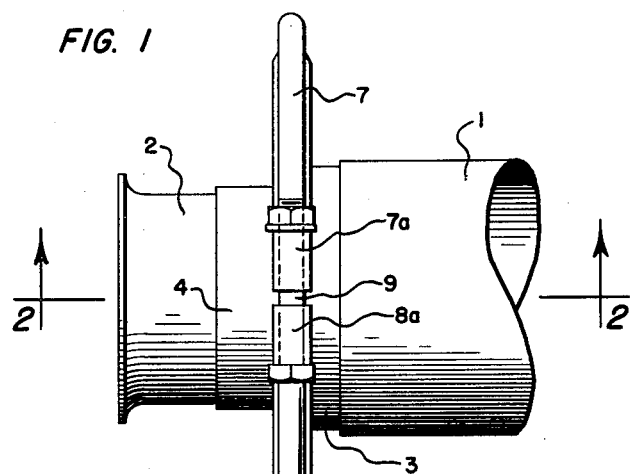
Figure 2:
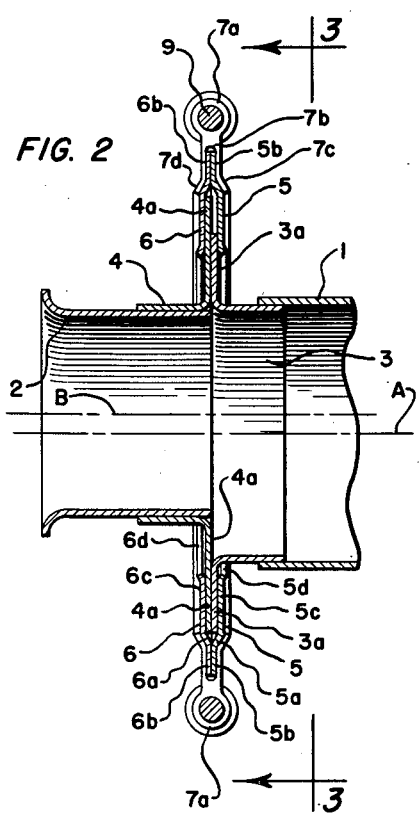
Figure 3:
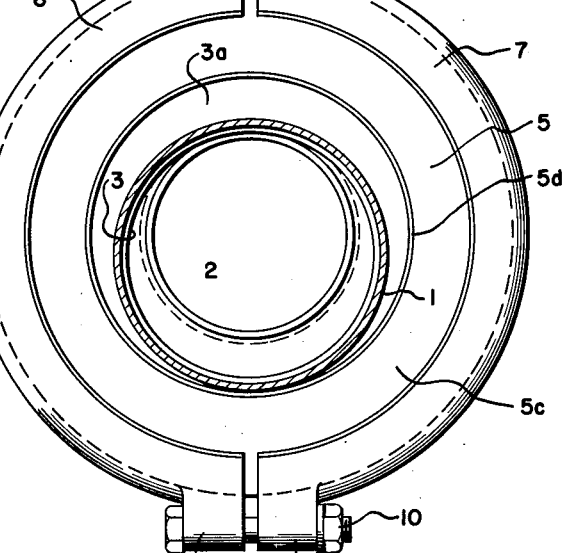

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my transverse slip joint for connecting tubular members, illustrating a pair of tubular members connected thereby; Fig. 2 is a sectional view, taken from the line 2—2 of Fig. 1; and Fig. 3 is a sectional view, taken from the line 3—3 of Fig. 2.

Similar characters of reference refer to similar parts and portions throughout the several views of the drawings.

The tubes 1 and 2, flange members 3 and 4, clamp rings 5 and 6, clamp members 7 and 8, and the bolts 9 and 10, constitute the principal parts and portions of my transverse slip joint for connecting tubular members.

The hollow tubes 1 and 2 are connected to the flange members 3 and 4, respectively, by welding or otherwise, as desired. These flange members 3 and 4 are made of heat resistant metal and provided with laterally extending annular flanges 3a and 4a, respectively, which are abutted to each other in face-to-face contact relationship. The clamp rings 5 and 6 are resilient and include inclined portions 5a and 6a, which are substantially equal to the thickness of the flange portions 3a and 4a, hereinbefore described.

Integral with these annular inclined portions 5a and 6a are the clamp-engaging contact portions 5b and 6b, which extend to the periphery of the clamp rings 5 and 6, all as shown best in Fig. 2 of the drawings. The clamp rings 5 and 6, inwardly of the annular inclined portions are provided with spaced flange retainer portions 5c and 6c, which are resilient, and which engage the flange portions 3a and 4a, respectively, of the flange members 3 and 4. The clamp rings 5 and 6 are provided with central openings 5d and 6d, at the edge of which these flange rings are flared outwardly, away from the flange portions 3a and 4a of the flange members 3 and 4.

The clamp members 7 and 8 are semi-circular and provided with aligned lugs 7a and 8a, through which the bolts 9 and 10 extend. These bolts 9 and 10 hold the clamp members 7 and 8 securely around the portions 5b and 6b of the clamp rings 5 and 6. The clamp members 7 and 8 are substantially identical in cross-sectional shape. The clamp member 7, as shown in Fig. 2 of the drawings, is provided with an annular internal recess 7b, of sufficient breadth to receive the portions 5b and 6b of the clamp rings 5 and 6. The clamp member 7 is also provided with flared portions 7c and 7d, which are annular and flared in diverging relationship to each other, coinciding with the annular inclined portions 5a and 6a of the clamp rings 5 and 6.

The operation of my transverse slip joint for connecting tubular members is substantially as follows:

As shown in Figs. 2 and 3 of the drawings, the axes A and B of the tubes 1 and 2 are laterally offset relative to each other, which is promoted by the laterally slidable relationship of the flange portion 3a of the flange member 3, which supports the tube 1 in connection with the tube 2. The engagement of the clamp members 7 and 8, with the annular inclined portions 5a and 6a of the clamp rings 5 and 6, induces stress in the resilient portions 5c and 6c of the clamp rings 5 and 6, holding the flange portions 3a and 4a of the flange members 3 and 4 in their abutted relationship with each other.

The resiliency of the portions 5c and 6c of the clamp rings 5 and 6 provides for resilient preloading of the flange portions 3a and 4a, in abutted relation to each other, effecting an efficient gas seal, but permitting lateral movement of the tube 1 relative to the tube 2 in a considerable variety of positions eccentric to the tube 2, all as shown best in Figs. 2 and 3 of the drawings.

It will be here noted that the flange member 3 is smaller in diameter than the openings 5d and 6d in the clamp rings 5 and 6, permitting lateral play of the flange portion 3a of the flange member 3 intermediate the engaging portion 5c of the clamp ring 5 and the flange portion 4a of the flange member 4.

It will be here noted that my transverse slip joint for connecting tubular members may be installed in exhaust systems of internal combustion engines, more particularly aircraft exhaust systems, and is readily adapted to provide efficient gas seal at high temperatures, and is also very efficient in resisting the effects of vibration laterally of the axes of the connected tubes. Such resistance to vibration laterally of the axes of the tubes is promoted by the slidable relationship of the flange 3a, as hereinbefore described, in its eccentric relationship to the tube 2. It will be noted that the tube 2 tends to remain concentric with the openings 5d and 6d in the clamp rings 5 and 6, due to the larger diameter of the flange portion 4a of the flange member 4, compared to the diameter of the flange portion 3a of the flange member 3. It is to be noted that either the flange portion 3a or 4a may be larger in diameter than the other, according to. design requirements, or installation requirements. Due to the particular abutted relationship of the flange portions 3a and 4a, held together by the clamp rings 5 and 6 of the clamp members 7 and 8, individual tube sections may be removed from a position intermediate other similar tubular sections without disturbing the same, and it is to be noted that the entire transverse slip joint for connecting tubes, as shown in Fig. 2 of the drawings, requires very little space longitudinally of the axes of the tubes 1 and 2, thus providing a very desirable arrangement for aircraft exhaust system installations, which are almost invariably limited in space.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a transverse slip joint of heat-resistant metal for connecting tubular members, a pair of annular transversely extending flange members having radially extending flanges abutted to each other, one of said flange members being a small diameter flange and the other of said flange members being a relatively large diameter flange, a pair of opposed resilient annular clamp members having radially inwardly disposed portions in abutment with each other and other portions disposed a substantial distance radially inwardly of the first mentioned portions and in spaced relationship to each other and engaging said flanges, tending to force the flanges together while permitting relative movement of a frictional sliding character, the annular space intermediate said clamp members being larger in diameter than the relatively small diameter flange and the outer diameter of the small diameter flange being substantially less than the inner diameter of said clamp members, a clamp of generally annular form encircling said clamp members and having portions transversely V-shaped in wedging engagement with said clamp members and forcing said clamp members together, said small diameter flange being freely movable laterally of its axis between said resilient clamp members, said tubular members being of different diameters and the smaller diameter tubular member having the smaller diameter flange thereon, said smaller tubular member having a diameter substantially less than the inner diameters of said clamp and said clamp members.

2. In a transverse slip joint for connecting tubular members, a pair of annular transversely extending flange members having radially extending flanges abutted to each other, one of said flange members being a small diameter flange and the other of said flange members being a relatively large diameter flange, a pair of resilient annular clamp members having radially inwardly disposed portions in abutment with each other and other portions disposed a substantial distance radially inwardly of the first mentioned portions and in spaced relationship to each other and engaging said flanges, tending to force said flanges together while permitting relative movement of a frictional sliding character, the annular space intermediate said clamp members being larger in diameter than the relatively large diameter flange, a clamp tending to force said clamp members together, said small diameter flange being freely movable laterally of its axis between said resilient clamp members, said clamp having an inwardly directed arcuate recess portion provided with outwardly diverging annular portions, adapted to engage said clamp members and compress them toward each other, said clamp members having annular offset portions, substantially conforming to said diverging portions of said clamp, said clamp comprising two substantially semi-circular sections, and means forcing said sections together, said tubular members being of different diameters and the smaller diameter tubular member having the smaller diameter flange thereon, said smaller tubular member having a diameter substantially less than the inner diameters of said clamp and said clamp members.

References Cited in the file of this patent

UNITED STATES PATENTS

| | | |
|---|---|---|
| 184,599 | Ehrhardt | Nov. 21, 1876 |
| 711,946 | Day | Oct. 28, 1902 |
| 1,474,995 | Burroughs | Nov. 20, 1925 |
| 1,632,042 | Price et al. | June 14, 1927 |
| 1,969,499 | Bradshaw et al. | Aug. 7, 1934 |
| 2,457,077 | Woolsey | Dec. 21, 1948 |
| 2,519,847 | Neely | Aug. 22, 1950 |
| 2,548,249 | Woolsey | Apr. 10, 1951 |